P. HADNAGY.
TRANSMISSION MECHANISM.
APPLICATION FILED AUG. 9, 1913.
1,119,426.
Patented Dec. 1, 1914.
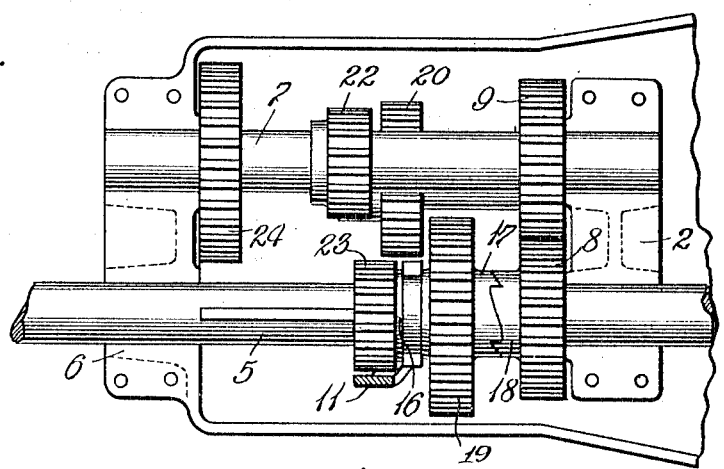
Fig. 1.
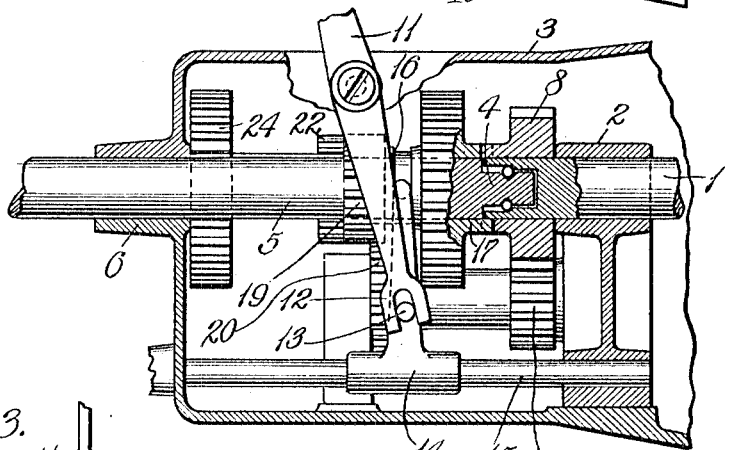
Fig. 2.
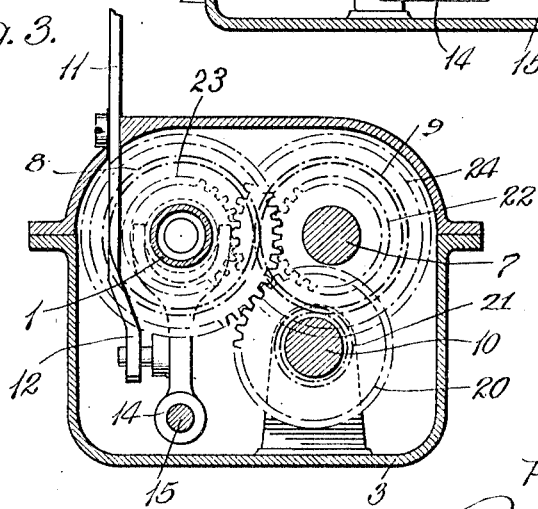
Fig. 3.
Witnesses
Chas W. Stauffiger
Anna M. Dorr
Inventor
Peter Hadnagy,
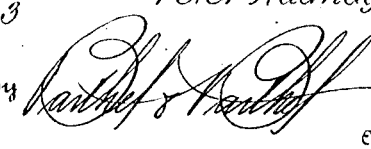
Attorneys

UNITED STATES PATENT OFFICE.

PETER HADNAGY, OF DETROIT, MICHIGAN.

TRANSMISSION MECHANISM.

1,119,426.  Specification of Letters Patent.  Patented Dec. 1, 1914.

Application filed August 9, 1913. Serial No. 783,875.

*To all whom it may concern:*

Be it known that I, PETER HADNAGY, a subject of the Emperor of Austria-Hungary, at present residing at Detroit, in the county of Wayne and State of Michigan, have invented certain new and useful Improvements in Transmission Mechanism, of which the following is a specification, reference being had therein to the accompanying drawings.

This invention relates to an improvement in transmission mechanism whereby simplicity of construction is combined with certainty of operation and compactness of design.

The invention consists in the matters hereinafter set forth, and more particularly pointed out in the appended claims.

In the drawings, Figure 1 is a view, partially in plan and partially in section, of a form of transmission mechanism that embodies the invention; Fig. 2 is a view, partially in section and partially in side elevation, of the mechanism, and Fig. 3 is a view, partially in end elevation and partially in section, of the mechanism.

Referring to the drawings, a main shaft 1 is journaled in a suitable bearing 2 of a casing 3 and is recessed at its end to receive the reduced end portion 4 of a follower shaft 5 in axial alinement therewith, a further suitable bearing 6 being provided for the latter shaft. A countershaft 7 is journaled in operative relation to the follower and drive shaft and is geared to turn with the drive shaft through the medium of a main gear meshing with a main pinion 9. A reverse shaft 10 is likewise journaled in the casing parallel to the other shaft and in proper distance relation thereto.

A lever 11 is pivoted on the casing with a forked end portion 12 embracing pins 13 on a yoke 14 that is reciprocable longitudinally on a guide member 15. The peripherally grooved hub 16 of a shiftable gear that is splined to slide longitudinally on the follower shaft 5 without rotating thereon, is engaged by the yoke to move therewith. A suitable clutch member 17 on the end face of the hub 16 adjacent the gear 8 is adapted to interlock with a corresponding clutch member 18 on the latter to turn the follower shaft in unison with the main shaft 1, one part 19 of the shiftable gear being meshed by suitable movement of the gear with a reverse pinion 20 on the reverse shaft 10. As the latter shaft is always turning with the main shaft through the medium of a pinion 21 constantly in mesh with the gear 9 of the countershaft 7, such engagement of the shiftable gear reverses the direction of motion of the follower shaft. The member 19 of the shiftable gear may likewise be moved into mesh with a pinion 22 on the countershaft, thereby driving the follower shaft at a lower speed than the main shaft. High speed is obtained by further movement of the shiftable gear so a smaller part 23 thereof engages with a comparatively large pinion 24 on the countershaft.

In operation proper manipulation of the shiftable gear either throws the clutch in for direct drive connection between the drive and follower shaft, or else brings about direct drive at different speeds according to the selection of gears, while reversal is obtained by meshing of the shiftable gear with the reverse pinion. Thus the various speeds are obtained by a mechanism which is compact, simple in construction, not liable to derangement and easily taken care of. As a matter of good practice it is advisable that the pivot or reduced end of the follower shaft travel in a ball bearing, such as indicated, in a recessed or counterbored end portion of the main shaft.

Obviously, changes in the details of construction may be made without departing from the spirit of my invention and I do not care to limit myself to any particular form or arrangement of parts.

What I claim is:—

A transmission mechanism comprising a casing, a main shaft journaled therein, a follower shaft journaled in said casing, and having one end thereof rotatably stepped in the end of said main shaft, a reverse shaft, a counter shaft, a gear upon said main shaft, a gear upon said counter shaft permanently meshing with the gear of said main shaft to turn said counter shaft in an opposite direction to said main shaft, a gear on said reverse shaft permanently meshing with the gear of said counter shaft to turn said reverse shaft in the same direction as said main shaft, a reverse pinion upon said reverse shaft, a shiftable gear non-rotatable upon said follower shaft and adapted in one position to be interlocked with said main shaft to rotate in the same direction and in another position free of said main shaft and meshing with said reverse pinion to rotate in an opposite direction to said main shaft, and change speed pinion on said counter shaft and adapted to be selectively engaged by said shiftable gear whereby the speed of said follower shaft can be increased and decreased relative to said main shaft.

In testimony whereof I affix my signature in presence of two witnesses.

PETER HADNAGY.

Witnesses:
C. R. STICKNEY,
A. M. DORR.

Copies of this patent may be obtained for five cents each, by addressing the "Commissioner of Patents, Washington, D. C."